United States Patent [19]

Visos et al.

[11] 4,205,972
[45] Jun. 3, 1980

[54] GAS VALVE WITH INTEGRAL DRIP LEG AND FILTER

[75] Inventors: Charles D. Visos, Manchester; Howard R. Kinsella, St. Louis, both of Mo.

[73] Assignee: Emerson Electric Co., St. Louis, Mo.

[21] Appl. No.: 953,022

[22] Filed: Oct. 20, 1978

[51] Int. Cl.² .............................................. B01D 46/10
[52] U.S. Cl. ........................................ 55/417; 55/423; 55/465; 431/119; 137/550
[58] Field of Search ................ 55/288, 355, 359, 421, 55/423, 417, 462, 465; 431/119, 42; 137/550, 544

[56] References Cited

U.S. PATENT DOCUMENTS

| 707,318 | 8/1902 | Geyer et al. | 55/417 |
|---|---|---|---|
| 1,573,929 | 2/1926 | Gall | 55/417 |
| 2,288,715 | 7/1942 | Karrer et al. | 55/417 |
| 2,514,623 | 7/1950 | Brown | 55/355 |
| 3,402,887 | 9/1968 | Visos | 236/21 |
| 3,505,793 | 4/1970 | Haskins | 55/417 |

*Primary Examiner*—Norman Yudkoff
*Attorney, Agent, or Firm*—Paul A. Becker, Sr.

[57] ABSTRACT

A gas valve device includes an integral drip leg and filter, positioned upstream from valve means contained therein, for collecting and removing liquid and solid impurities from a gas stream. The drip leg and filter includes a fine-mesh screen of significantly larger cross-sectional area than an inlet opening through which the gas stream enters the gas valve device. The screen is positioned at an angle to cause solid particles to be deflected away from the screen. Clean-out means is located between the inlet opening and the screen for collecting and removing the accumulated liquid and solid impurities. In a preferred embodiment, a detachable cover can be removed to enable cleaning or replacing the screen.

3 Claims, 5 Drawing Figures

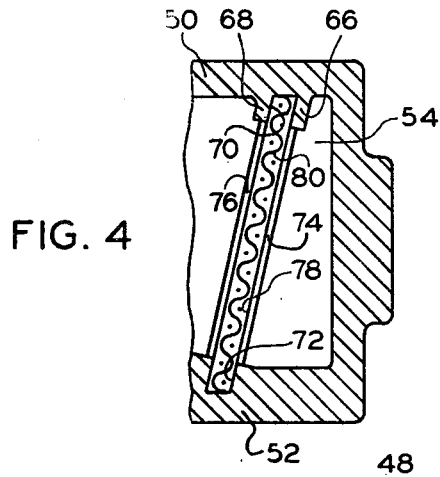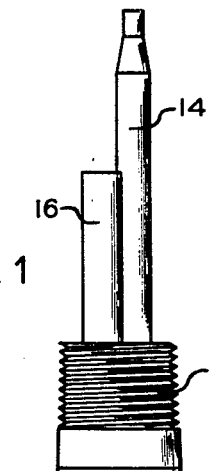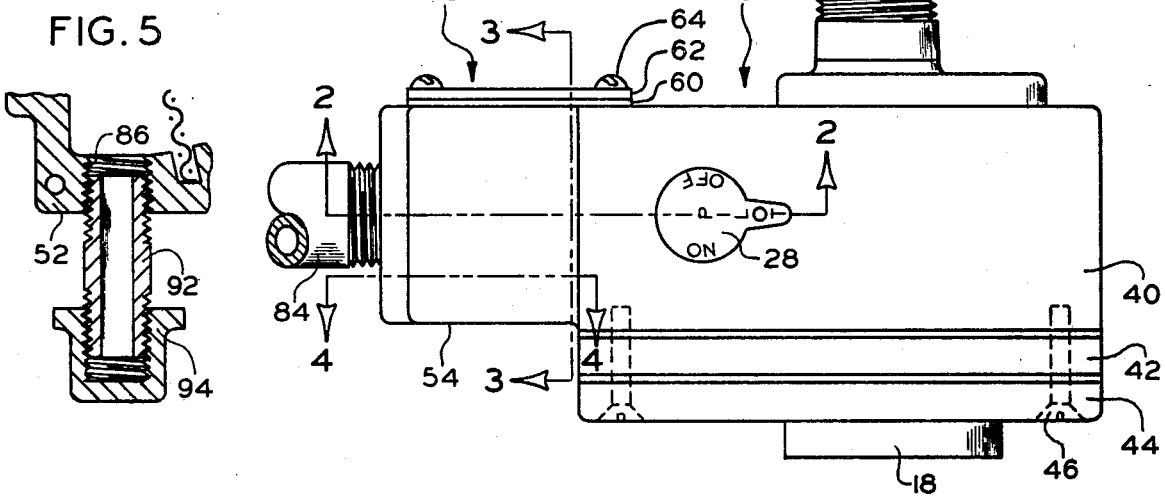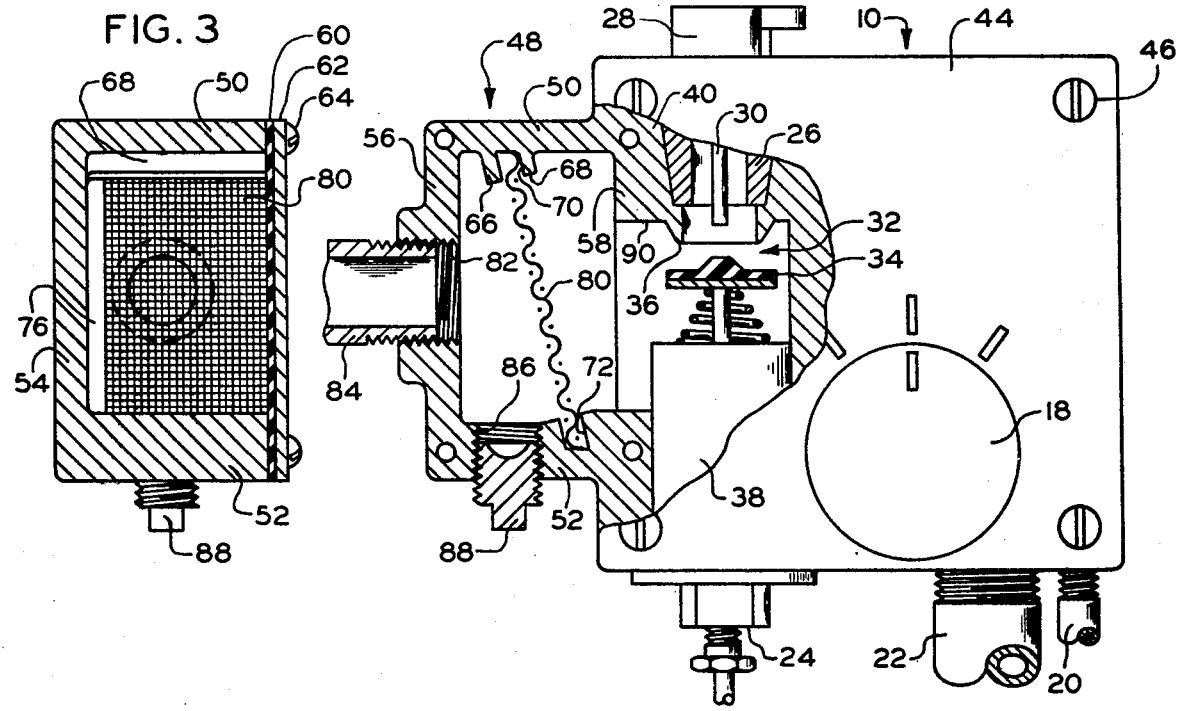

GAS VALVE WITH INTEGRAL DRIP LEG AND FILTER

This invention relates to gas flow control devices having integral means for collecting impurities present in a gas supply.

The stream of gas flowing to a gas flow control device such as a gas valve for controlling operation of a burner, usually contains a certain amount of liquid and solid impurities. The liquid impurities, commonly referred to as drip oil, includes various agents such as fogging oil, odorous additive, and condensates. Solid impurities include particles such as metal chips, dust, and scale.

To prevent entry of such impurities into the gas valve where they might accumulate on the main control valve seat and result in some degree of gas leakage when the valve is deenergized, it has been the usual practice to provide a drip leg upstream from the gas valve. The drip leg conventionally comprises a T pipe fitting so arranged that the supply gas enters the fitting vertically downward through the upper of the axially aligned openings of the fitting and exits horizontally to the gas valve through the lateral opening intermediate the upper and lower axially aligned openings. A capped pipe nipple is attached to the lower axially aligned opening.

With this drip leg arrangement, the drip oil and the heavier solid particles are readily deposited in the capped pipe and thus are prevented from entering the gas valve. However, this arrangement is expensive and is ineffective to remove lighter solid particles which may be carried by the gas stream. Accordingly, it has been a common practice to incorporate a screen in the inlet port of the gas valve. However, the capability of the screen to filter very small particles has generally been compromised to negate excessive pressure drop across the screen which would adversely affect the flow capacity of the gas valve. Thus, an objection to the arrangement of a drip leg external to the gas valve is the expense of installation, and an objection to the screen incorporated in the gas valve is the compromising of the mesh size.

Therefore, an object of this invention is to provide a gas valve with an integral drip leg and filter for removing impurities from a gas stream without adversely affecting the flow capacity of the gas valve.

Another object is to provide a gas valve with an integral drip leg and filter wherein the filter comprises a fine-mesh screen of relatively large cross-sectional area so as to filter very small particles but not to result in a significant pressure drop thereacross.

Another object of this invention is to provide a gas valve with an integral drip leg and filter wherein the filter comprises a fine-mesh screen which is removable from the gas valve for cleaning or replacement.

Yet another object is to provide a gas valve with an integral drip leg and filter which is economical to manufacture.

Further objects and advantages will appear from the following description when read in accordance with the accompanying drawings.

BRIEF DESCRIPTION OF THE DRAWINGS

FIG. 1 is a top plan view of a gas valve device embodying the present invention;

FIG. 2 is a front elevation view of the device shown in FIG. 1 with a partial cross-sectional view taken generally along line 2—2 of FIG. 1;

FIG. 3 is a cross-sectional view taken along line 3—3 of FIG. 1;

FIG. 4 is a fragmentary cross-sectional view taken generally along line 4—4 of FIG. 1; and FIG. 5 is a fragmentary cross-sectional view showing a modified form of a drip leg.

DESCRIPTION OF THE PREFERRED EMBODIMENT

Although a particular gas valve incorporating the integral drip leg and filter is described as follows, it is to be understood that the drip leg and filter can also be made integral with other gas valves.

Referring to the drawings, a gas valve device indicated generally at 10 is provided with a screw-threaded fitting 12 for connection to a threaded opening in a domestic water heater (not shown). Extending outwardly from fitting 12 and exposed to the water in the water heater are temperature sensing elements 14 and 16. Sensing element 14 comprises a rod and tube element which cooperates with a temperature setting knob 18 and a valve member (not shown) to maintain the water at a temperature value selectable by knob 18. Sensing element 16 comprises a hollow tube containing a temperature responsive switch (not shown) which is effective to prevent excessive water temperature.

Connected to gas valve 10 is a pilot burner conduit 20 and a main burner conduit 22. A thermocouple (not shown) is connected at 24 to gas valve 10.

Gas valve 10 also includes a plug-cock 26 having positions of "pilot", "off", and "on" selectable by a knob 28. With the knob 28 in the "pilot" position, knob 28 can be manually depressed downwardly, causing a rod 30 to move downwardly and open a safety valve indicated generally at 32. Valve 32 includes a valve closure member 34 and a seat 36.

With safety valve 32 open, gas can flow through gas valve 10 to the pilot burner (not shown) via pilot burner conduit 20. When the thermocouple is sufficiently heated by the pilot burner flame, knob 28 can be released from its depressed position and safety valve 32 will be held open by an electromagnet 38 energized by the thermocouple. When the knob 28 is subsequently manually rotated to the "on" position, sensing element 14 is effective to control the flow of gas to the main burner (not shown) to enable the main burner to be ignited by the pilot burner flame. Should the pilot burner flame be extinguished for any reason, the electromagnet 38 is de-energized, closing safety valve 32. The temperature responsive switch of sensing element 16 is electrically connected in circuit with the electromagnet 38 so that opening of the temperature responsive switch also causes safety valve 32 to close.

The above described construction is well known and further explanation is deemed unnecessary for purposes of describing the present invention. However, if more details of construction or operation are desired, reference may be had to U.S. Pat. No. 3,402,887.

Gas valve 10 comprises a plurality of cast aluminum body members 40, 42, and 44 secured together by screws 46. The drip leg and filter portion of gas valve 10 is indicated generally at 48, and as illustrated in FIG. 2, is integral with body member 40.

The drip leg and filter portion 48 is a generally rectangular casing and defines a chamber comprising an upper wall 50, a bottom wall 52, a front wall 54, side walls 56 and 58, and a removable back wall in the form of a gas sealing gasket 60 and a cover plate 62 attached to body member 40 by screws 64.

Integral with upper wall 50 and projecting downwardly therefrom are two ribs 66 and 68 which are slanted slightly toward side wall 58. Ribs 66 and 68 define a slot 70 therebetween and extend between front wall 54 and gasket 60.

Formed in the bottom wall 52 and extending between front wall 54 and gasket 60 is a slot 72. Slot 72 is parallel with slot 70 but is located nearer side wall 58 than slot 70.

Integral with front wall 54 and projecting therefrom are two ribs 74 and 76. As shown in FIG. 4, ribs 74 and 76 extend from ribs 66 and 68, respectively, in upper wall 50 to the bottom wall 52 and define a slot 78 which is continuous with both slots 70 and 72. A small-mesh screen 80, preferrably 50 mesh, is positioned in slots 70, 72, and 78, whereby screen 80 is at an angle less than 90 degrees with respect to bottom wall 52.

Side wall 56 is provided with a screw-threaded bore 82 for receiving a gas supply conduit 84. Bottom wall 52 is provided with a screw-threaded bore 86, located upstream from slot 72, for receiving a cavitated, screw-threaded, clean-out closure plug 88. Side wall 58 is provided with a large opening 90 through which supply gas flows after having passed through screen 80.

With the arrangement described, supply gas containing various liquid and solid impurities enters gas valve 10 through the gas supply conduit 84 connected to bore 82 in side wall 56. Since screen 80 is at an angle less than 90 degrees with respect to the bottom wall 52, solid particles tend to fall, due to gravity, to bottom wall 52 after hitting screen 80. Liquid impurities tend to flow along the inside surface of gas supply conduit 84, along side wall 56 and bottom wall 52, and into bore 86 and plug 88.

Since screen 80 is considerably larger in cross-sectional area than the bore 86, a large portion of screen 80 can become coated with impurities that adhere to the screen before gas flow capacity will be significantly reduced. While such a condition may never occur, the preferred embodiment allows for removal of the screen 80 to enable cleaning or replacing it by incorporating the removable gasket 60 and cover plate 62. The screws 64 securing gasket 60 and cover plate 62 to body member 40 are preferrably located on the rear of gas valve 10. This screw location discourages unknowledgeable homeowners from removing the screen but yet enables removal by trained service personnel. If, for any reason, a removable screen is not desired, body member 40 can be revised to provide the rear wall of the drip leg and filter chamber, and body member 42 can be revised to provide the front wall.

Impurities that collect on the bottom wall 52, in bore 86, and in plug 88 can be removed by removing plug 88. A relatively large amount of impurities can accumulate on the bottom wall 52 between screen 80 and side wall 56 before effecting a significant pressure drop across screen 80 so that frequent removal of plug 88 is unnecessary. To increase the capacity of accumulation, the modified form of FIG. 5 can be utilized, wherein a threaded pipe 92 is connected to bore 86 in bottom wall 52, and the lower end of pipe 92 is closed by a threaded cap 94.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

We claim:
1. In a gas valve,
 valve means for controlling flow of gas to a burner;
 casing means for said valve means comprising a plurality of body members;
 one of said body members extending upstream from said valve means and provided with an inlet opening for receiving a gas supply conduit and defining a chamber between said inlet opening and said valve means;
 said chamber being significantly larger in cross-sectional area than said inlet opening;
 filter means significantly larger in cross-sectional area than said inlet opening interposed in said chamber and displaced from said inlet opening to said chamber and extending across said chamber;
 said filter means being disposed at an angle significantly inclined from vertical so that a bottom portion of said filter means forms an acute angle with a bottom wall of said chamber on the upstream side of said filter means as to cause solid particles entering said chamber to be deflected downwardly;
 means detachably connected to said bottom wall of said chamber between said inlet opening and said filter means for collecting and removing said solid particles; and
 said detachably connected means also being positioned with respect to said inlet opening so as to enable collecting and removing liquid impurities entering said chamber

2. The gas valve claimed in claim 1 wherein said one of said body members extending upstream from said valve means includes a side wall containing said inlet opening and said inlet opening is horizontal.

3. The gas valve claimed in claim 1 wherein said chamber is defined by said bottom wall, an upper wall, a side wall containing said inlet opening, an opposed side wall having an opening through which gas flows to said valve means, a front wall, and a detachable cover plate for providing a rear wall for said chamber between said side walls and between said upper and bottom walls, said filter means comprising a screen extending between said front wall and said cover plate and between said upper wall and said bottom wall.

* * * * *